United States Patent
Fu et al.

(10) Patent No.: US 10,299,328 B2
(45) Date of Patent: May 21, 2019

(54) LED DRIVER CIRCUIT, LIGHTING ARRANGEMENT AND DRIVING METHOD

(71) Applicant: SIGNIFY HOLDING B.V., Eindhoven (NL)

(72) Inventors: Jie Fu, Eindhoven (NL); Liang Shi, Eindhoven (NL); Xiao Sun, Eindhoven (NL); Jimmy Jiang, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/560,822

(22) PCT Filed: Mar. 15, 2016

(86) PCT No.: PCT/EP2016/055569
§ 371 (c)(1),
(2) Date: Sep. 22, 2017

(87) PCT Pub. No.: WO2016/150768
PCT Pub. Date: Sep. 29, 2016

(65) Prior Publication Data
US 2018/0116015 A1  Apr. 26, 2018

(30) Foreign Application Priority Data
Apr. 27, 2015 (EP) .................................... 15165202

(51) Int. Cl.
*H05B 33/08* (2006.01)
(52) U.S. Cl.
CPC ....... *H05B 33/083* (2013.01); *H05B 33/0815* (2013.01); *H05B 33/0842* (2013.01); *Y02B 20/383* (2013.01)
(58) Field of Classification Search
None
See application file for complete search history.

(56) References Cited

U.S. PATENT DOCUMENTS

| 4,145,638 A | 3/1979 | Kaneda |
| 5,079,485 A | 1/1992 | Hasemann et al. |

(Continued)

FOREIGN PATENT DOCUMENTS

| CN | 102754530 A | 10/2012 |
| EP | 2257124 A1 | 12/2010 |

*Primary Examiner* — Dion Ferguson
*Assistant Examiner* — Srinivas Sathiraju (57) ABSTRACT

A first LED driver circuit comprising: a first input interface (30) for receiving an AC power input and providing a first output, wherein said first output is adapted to be connected to a second LED driver circuit; a first LED driver (32) powered by the first output; a first shorting element (36) for shorting the first output; a first control arrangement (38) for controlling the first shorting element wherein the first control arrangement (38) is adapted to close the first shorting element (36) during only one subset of half cycles of the AC power input to short circuit the first LED driver (32) and to prevent the first LED driver (32) from being powered by the AC power input, when the second LED driver circuit is powered by the AC power input complementarily with respect to the unpowered first LED driver (32) and, open the first shorting element (36) during the other subset of half cycles to allow the AC power input to power the first LED driver (32), when the second LED driver circuit is not powered by the AC power input complementarily with respect to the first LED driver (32); wherein the half cycle is the positive amplitude duration or the negative amplitude duration of the AC power input This means two of the LED driver circuits may be used in series, each one is supplies by power or not complementarily based on only one subset of half cycles of the AC power input.

15 Claims, 4 Drawing Sheets

(56) References Cited

U.S. PATENT DOCUMENTS

| | | | |
|---|---|---|---|
| 5,726,535 | A | 3/1998 | Yan |
| 8,531,109 | B2 | 9/2013 | Visser et al. |
| 2010/0270925 | A1 | 10/2010 | Withers |
| 2011/0149563 | A1 | 6/2011 | Hsia et al. |
| 2014/0340884 | A1 | 11/2014 | Hsia et al. |

LED DRIVER CIRCUIT, LIGHTING ARRANGEMENT AND DRIVING METHOD

CROSS-REFERENCE TO PRIOR APPLICATIONS

This application is the U.S. National Phase application under 35 U.S.C. § 371 of International Application No. PCT/EP2016/055569, filed on Mar. 15, 2016 which claims the benefit of Patent Application No. PCT/CN2015/075136, filed on Mar. 26, 2015 and European Patent Application No. 15165202.1, filed Apr. 27, 2015. These applications are hereby incorporated by reference herein.

FIELD OF THE INVENTION

This invention relates to LED driver circuits and driving methods. It is of particular interest for LED tubular lighting but also has more general applicability.

BACKGROUND OF THE INVENTION

Luminaires with fluorescent tubular lamps are widely used in offices. In Europe, luminaires with multiple lamps in series are also used. For example, luminaires with three 60-cm tubular lamps are popular, such as troffers. In general, this type of luminaire has two lamps in series, driven by a high power ballast, and the third lamp is driven by a low power ballast.

Figure 1:
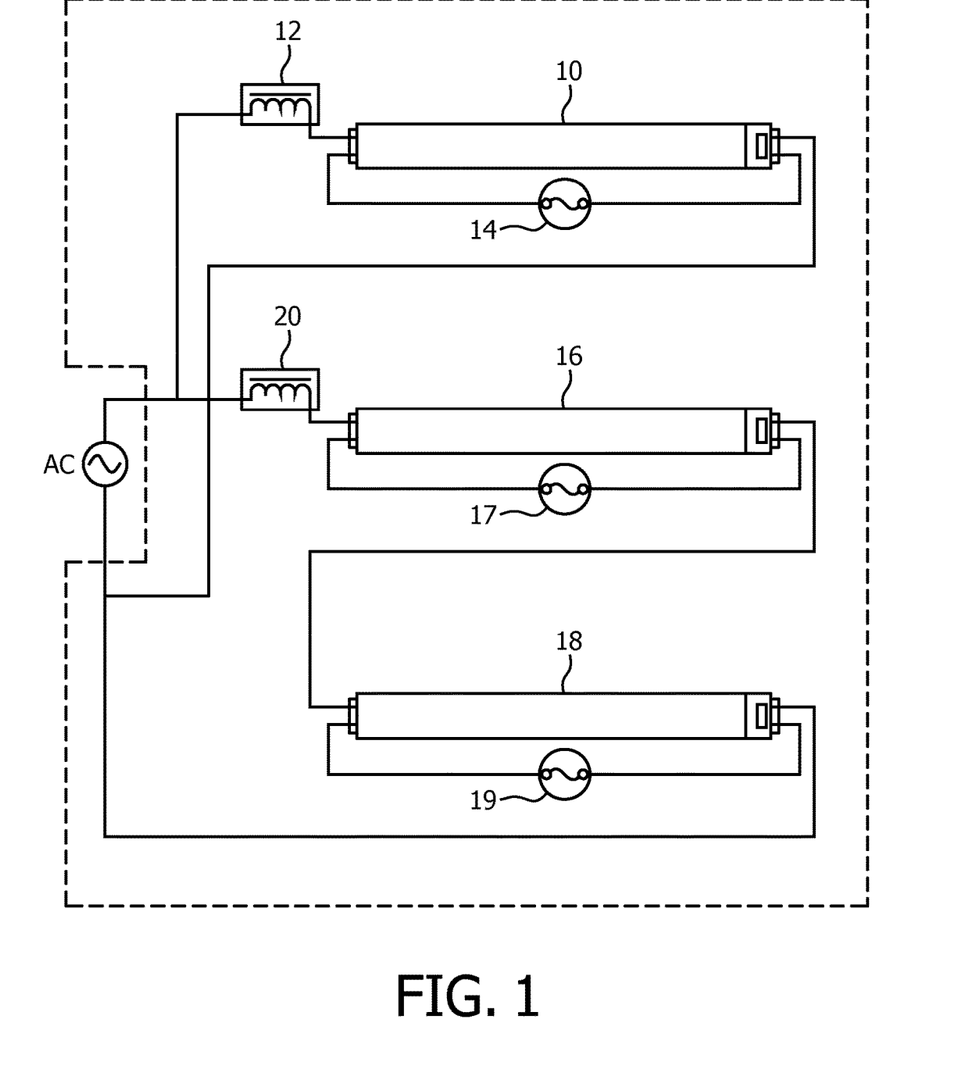
FIG. 1 shows a known configuration of three fluorescent tubular lamps, with two in series and one in parallel.

The structure of this type of luminaire is shown in FIG. 1.

A first lamp 10 is driven by a low power ballast 12 and a dummy starter 14. Second and third lamps 16 and 18 are in series, and are driven as a single entity by a high power ballast 20. Each has its own dummy starter 17, 19.

There is an increasing demand for LED replacements for the fluorescent tubular lamps, and in particular which do not need the luminaire to be changed. There is accordingly a very large retrofit market for tubular LED lamps, for replacing traditional fluorescent tubular lamps. However it is challenging to make an LED driver design which enables series connection of the LED lamps with their associated driver.

It is easy to connect traditional fluorescent lamps in series, since the equivalent impedance of traditional fluorescent lamp is negative. This means the input voltage for each lamp can self-regulate when they are in series.

For an LED lamp, it is more challenging to connect the LEDs in series. In particular, the impedance of a closed loop driver is positive, which gives rise to positive feedback and the possibility of an unbalance of input voltage on each lamp.

For example, if two closed loop drivers are connected in series it becomes difficult to provide the required balance between the circuits, as a result of circuit tolerances. More specifically, for a closed loop circuit, the driver will try to keep the driver output stable, but the input impedance of the closed loop driver will change following the input voltage. For example $R=U_{in}^2/P$, where P is the power, Uin is the voltage and R is the resistance. If P is fixed then R will change to follow Uin.

In a series connection, the increased resistance will in turn result in an increased voltage allocated to that driver. With two closed loop drivers connected in series, there is a possibility that one driver develops a larger and larger voltage than the other driver, and the imbalance becomes worse and worse until there are abnormal driving conditions. Even if the system reaches a stable steady state, there may still be an imbalance between the two drivers. This means that different lamps may have different outputs, and instability may also give rise to flicker.

A possible solution is to use open loop drivers. An open loop driver has an input impedance which behaves as a fixed resistor. Since an open loop driver has a relatively stable input impedance, it is easier to provide balancing between them. However, open loop control means the light output is unregulated during input or output disturbances, and the output is influenced significantly by tolerances of the main parameters of the LED driver.

EP2257124A1 discloses a circuit for connecting a low current lighting circuit to a dimmer. It has a switch that closes when the output of the bridge rectifier falls below 200 volts. When the switch closes, it provides a resistive load that provides holding current for the triac of the dimmer.

SUMMARY OF THE INVENTION

It would be advantageous to provide an LED driver circuit which enables closed loop current control or closed loop power control and that can operate normally in the context of series connection with another LED driver, avoiding the technical problem of unbalanced voltage developed on this and the another LED driver due to their negative impedance.

A basic idea of the embodiments of the invention is the two LED drivers work complementarily in each half cycle: in one given half cycle there is one and only one LED driver is powered by the AC input power; and in next half cycle the other LED driver is powered by the AC input power. This complementary operation is implemented by the complementarily open/closing of two shorting element across each LED driver. Thus a technical problem of unbalance voltage developed on the two LED drivers, in case they work simultaneously, is overcome.

To better address this concern, the invention is defined by the claims.

According to examples in accordance with an aspect of the invention, there is provided a first LED driver circuit comprising:

a first input interface for receiving an AC power input and providing a first output, wherein said first output is adapted to be connected to a second LED driver circuit;

a first LED driver powered by the first output;

a first shorting element for shorting the first output;

a first control arrangement for controlling the first shorting element wherein the first control arrangement is adapted to close the first shorting element during only one subset of half cycles of the AC power input to short circuit the first LED driver and to prevent the first LED driver from being powered by the AC power input, when the second LED driver circuit is powered by the AC power input complementarily with respect to the unpowered first LED driver and, open the first shorting element during the other subset of half cycles to allow the AC power input to power the first LED driver, when the second LED driver circuit is not powered by the AC power input complementarily with respect to the first LED driver; wherein the half cycle is the positive amplitude duration or the negative amplitude duration of the AC power input.

This driver circuit is able to be controlled to draw power only during the other subset of half cycles (i.e. only the positive phases or the negative phases) of an AC power input, while in the one subset of half cycles the first output is short-circuited thereby disabling the first LED driver and allowing the power delivered to a second LED driver circuit. The first LED driver may be connected in series with the LED driver circuit which acts alternatively/complementarily with respect to the first LED driver, namely drawing power from the AC power input during the subset of half cycles and being disabled during the other subset. The problem of a shared voltage across a series string of LEDs is thus avoided. In this way, two LED drivers may operate in a time division manner, and stability and balancing issues are overcome. The LED driver (of each driver circuit) may implement closed loop feedback control, by which is meant that there is negative feedback from a sensor (such as a current sensor) for controlling a current or power delivered to the load.

In a further embodiment, the first LED driver circuit may further comprise:

a first buffering capacitor between the first shorting element and the first LED driver; and a first blocking diode in a forward direction from the first shorting element to the first buffering capacitor.

Many LED drivers need a buffering capacitor before the driver to smooth the input power. If the input of the LED driver is short-circuited, there is a risk that this buffering capacitor is discharged by the short-circuiting. To address this concern, the blocking diode prevents the buffering capacitor from discharging via the first shorting element when the first shorting element is closed. The buffering capacitor is used to maintain a stable voltage input to the LED driver and reduce ripple. By "forward direction" is meant the direction in which the diode is able to conduct current.

In a further embodiment, the first control arrangement may comprise a configuration circuit for closing the first shorting element every other half cycle of the AC power input, wherein the every other half cycle is the subset; and for opening the first shorting element during the rest of the half cycles of the AC power input, wherein the rest of the half cycles is the other subset.

This configuration circuit means the circuit can short or not short one driver during different phases of the AC input power. No calibration or particular connection scheme of the individual LED drivers is required for them to be used in series. Also, the operation in every other cycle helps evenly balancing the operation of the two drivers and reduces visible flicker.

In a further embodiment, the configuration circuit may comprise a detection circuit which detects whether the voltage on the output is greater than a certain threshold, and wherein the configuration circuit is adapted to close or to open the first shorting element based on the detection.

Before any of the shorting elements are active, two LED drivers may be operated to share the input AC power. However, circuit instability will result in one of the LED driver circuits becoming dominant at a particular time. When this happens, it is detected by the threshold detection, which then enables the allocation of the subsets of half cycles to the two LED drivers. Since the voltage level is automatically set for both of the series-connected drivers, this provides an inherent synchronization without any real communication/coordination between the two drivers, avoiding physical connections and saving complexity.

In a further embodiment, the configuration circuit may be adapted to close said first shorting element in a second half cycle succeeding a first half cycle when the detected voltage in said first half cycle exceeds the threshold, and open said first shorting element in a fourth half cycle succeeding a third half cycle when the detected voltage in said third half cycle does not exceed the threshold.

Thus, the shorting function is controlled based on threshold detection in the previous half cycle. When one is drawing more power, it effectively allocates the next half cycle to the other LED driver by activating its own shorting element and disabling itself in the next half cycle. When both LED drivers use this same approach (because they are for example identical), the required alternating actuation of the shorting elements results with no self-conflict.

In a further embodiment, the configuration circuit may further comprise a zero crossing detector circuit for detecting a phase change in the AC power input for determining the timing of each half cycle.

This zero crossing detection signal may be used to form the control signals for the shorting elements.

In a further embodiment, the first LED driver is for example a closed loop current source or a closed loop power source. The input interface may for example comprise a full bridge rectifier.

As explained above, the complete driver system may comprise two individual driver circuits of the first LED driver type defined above and a second LED driver. In this case, the second driver circuit comprises:

a second input interface for generating a second output, the first and second input interfaces electrically series connected and in electrically series with a pair of AC power input terminals which receive the AC power input;

a second LED driver powered by the second output;

a second shorting element for shorting the second output; and a second control arrangement for controlling the second shorting element wherein the second control arrangement is adapted to close the second shorting element during only the other subset of half cycles of the AC power input when the first shorting element opens the first shorting element thereby the first LED driver is powered by the AC power input; and open the second shorting element during the subset of half cycles of the AC power input when the first shorting element closes the first shorting element thereby the second LED driver is powered by the AC power input; thereby the first LED driver and the second LED driver are powered and shorted complementarily in each half cycles of the AC power input.

This arrangement places two input interfaces and two LED drivers in series. To avoid instability and non-uniform outputs, each LED driver is only operated during one subset of half cycles. This provides a time sharing use of the AC input power between the two LED drivers. One subset of half cycles is the positive polarity phases of the input power signal and the other subset of half cycles is the negative polarity phases of the input power signal. This enables two LED arrangements, each with their own driver, to be placed in series to form the overall driver circuit.

In this way, two closed looped LED drivers may be made to operate in series. The LED drivers work in an interleaved/complementarily manner.

The first input interface, LED driver, shorting element and control arrangement may form a first LED driver arrangement, and the second input interface, LED driver, shorting element and control arrangement may form a second LED driver arrangement. The overall driver circuit then comprises two LED driver arrangements, and each LED driver arrangement includes its own LED driver.

This invention is directed to an LED driver circuit which comprises a single one of the LED driver arrangements (e.g. a single tubular LED) or to a configuration with two LED driver arrangements (e.g. a set of two tubular LEDs). Thus, the term "LED driver circuit" is intended to relate to one or more LED driver arrangements as described.

In a preferred embodiment, the driver system is further adapted to swap the half cycles during which the first shorting element is opened and the half cycles during which the second shorting element is opened. This means the driver system swaps the half cycles during which the first shorting element is closed and the half cycles during which the second shorting element is closed. For example, in first 10 cycles of the mains, which is 200 ms, the first LED driver is driven in each first/positive phase of the cycles while the second LED driver is driven in each second/negative phase of the cycles. In next 10 cycles of the mains, the driver system swaps the order: the first LED driver is driven in each second/negative phase of the cycles while the second LED driver is driven in each first/positive phase of the cycles. An advantage of this embodiment is reducing the EMI/noise/resonance issue that may occur when the LED driver always operates in the same time instant.

The first and second LED driver arrangements may have identical hardware.

In this way, no special modifications are needed to the LED driver arrangements to enable them to be connected together in series. Since due to the inherent impedance variance of the two LED drivers, one LED driver will first reach the threshold and start the alternating shorting and not shorting, and in turn the other LED driver will also reach the threshold and start the complementarily operation. This simplifies installation and design.

The invention also provides a lighting system comprising:
a driver system as defined above;
a first LED arrangement driven by the first LED driver; and
a second LED arrangement driven by the second LED driver.

The first and second LED arrangements may each a tubular LED. The whole lighting circuit may be the major electronic part of a light troffer, popular in an indoor office environment.

The invention also provides an LED driving method, comprising:
providing first and second outputs each from a respective first and second input interface, with the first and second input interfaces electrically series connected and in series electrically with a pair of AC power input terminals which receive an AC power input;
shorting or not shorting, by closing or opening a first shorting element, the first output, and not shorting or shorting the second output, by opening or closing a second shorting element, complementarily with respect to the first shorting element, in each half cycle of the AC power input, such that
powering a first LED driver using the first output in a subset of the half cycles when the second outputs are shorted and the second LED driver are not powered;
powering a second LED driver using the second output in another subset of the half cycles when the first outputs are shorted and the first LED driver are not powered.

This method provides alternate/complementary allocation of AC power in time division manner to two LED drivers which are in series.

The LED drivers may each comprise a closed loop current source or a closed loop power source, and the method further comprises for each output:
detecting whether the voltage on the output is greater than a threshold,
shorting said output by closing the respective shorting element in a second half cycle succeeding a first half cycle when the detected voltage in said first half cycle exceeds the threshold, and
not shorting said output by opening the respective shorting element in a fourth half cycle succeeding a third half cycle when the detected voltage in said third half cycle does not exceed the threshold.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an LED driver circuit comprising a first input interface for receiving an AC power input and providing a first output, and a first LED driver powered by the first output. A first shorting element is provided for shorting the first output, and it is controlled such that it is active during only one subset of half cycles of the AC power input and inactive during the other subset of half cycles. This means two of the driver circuits may be used in series, each one supplying power based on only one subset of half cycles of the AC power input.

Figure 2:
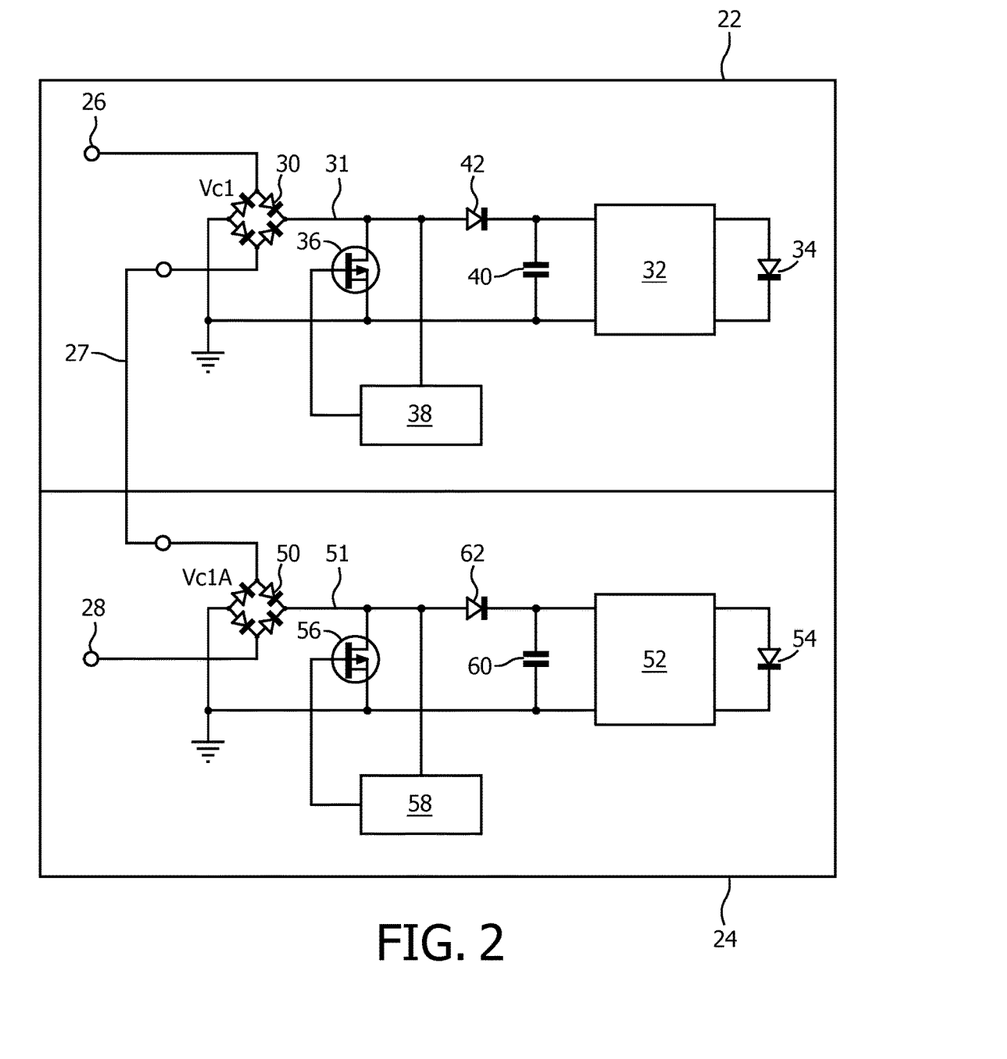
FIG. 2 shows an LED driver circuit.

FIG. 2 shows an LED driver circuit, which comprises two LED driver arrangements 22, 24 in series between an AC input received at first and second input 26, 28.

Each LED arrangement 22, 24 may form a tubular lamp. The two arrangements together may thus form a two-lamp luminaire, or a pair of lamps within a luminaire having other lamps as well. The LED circuit which is the subject of this invention may comprise a single LED driver arrangement or a pair of the LED driver arrangements.

By "connected in series" is meant that the first LED driver arrangement 22 receives as input power supply a signal between the first terminal 26 and an intermediate terminal 27, and the second LED driver arrangement 24 receives as input power supply a signal between the intermediate terminal 27 and the second terminal 28.

The two LED driver arrangements 22, 24 are identical, and the first LED driver arrangement 22 will be discussed in detail.

The first LED driver arrangement 22 comprises a first input interface 30 for receiving the AC power input from the respective pair of input terminals (26 and 27 for the first LED driver arrangement 22), and for providing a first output. The input interface 30 is a full bridge diode rectifier so that the first output Vc1 is a rectified output between a voltage bus 31 and ground. It is also possible for the rectifier to be ahead of the driver circuit and the input interface receives an AC power input that has already been rectified.

In this case the input interface is just connection pins. No matter what the implementation of the input interface is, it provides access to either rectified or un-rectified AC power input with half cycles.

A first LED driver 32 is powered by the first output Vc1. The LED driver drives an output load in the form of LED 34.

A first shorting element 36 is provided for shorting the first output, connected between the voltage bus 31 and ground. As shown in FIG. 2, the shorting element comprises a shorting MOSFET across the output of the input interface and thereby across the input of the LED driver. In an alternative embodiment, the shorting element can also be implemented by other transistors or other controllable switches.

A first control arrangement 38 is provided for controlling the first shorting element 36 such that it is active during only one subset of half cycles of the AC power input and inactive during the other subset of half cycles.

This means the LED driver arrangement 22 only draws power during the other subset of half cycles (i.e. only the positive phases or the negative phases) of the AC input across terminals 26,27, while in the one subset of half cycles the input of the LED driver is short-circuited and AC input power is bypassed to the other LED driver arrangement.

The LED driver 32 in preferred examples is a closed loop driver. This means it provides feedback to control the current delivered to the load 34. This feedback may for example comprise a voltage across a current sense resistor which voltage is indicative of the current through the sense resistor and the LED. The feedback mechanism comprises a comparator arrangement for comparing the voltage sensed across the current sense resistor with a reference value, and the difference is used as a feedback control parameter. The feedback control parameter regulates the setting of the driver, for example the duty cycle of a switch mode power supply, in order to maintain the desired output current.

A conventional current regulating LED driver may be used and there are various possible designs which may be used as will be well known to those skilled in the art.

A first buffering capacitor 40 is provided between the first shorting element 36 and the first LED driver 32, connected between the voltage bus 31 and ground. It stabilizes the voltage provided to the LED driver 32. A first blocking diode 42 is provided in a forward direction (by which is meant the direction in which current can flow) from the first shorting element 36 to the first buffering capacitor 40. It is provided along the voltage bus 31, thus with the anode connected to the first shorting element 36 and the cathode connected to the first buffering capacitor 40.

The first blocking diode 42 prevents the first buffering capacitor 40 from discharging via the first shorting element 36 when the first shorting element 36 is closed.

As mentioned above, the first and second LED driver arrangements 22, 24 may be identical.

The second LED driver arrangement 24 thus comprises:
a second input interface 50 (i.e. full bridge diode rectifier) for generating a second output Vc1A on a second bus 51;
a second LED driver 52 powered by the second output Vc1A and which delivers power to a second LED 54;
a second shorting element 56 for shorting the second output;
a second control arrangement 58 for controlling the second shorting element 56 such that it is active during only the other subset of half cycles of the AC power input and inactive during the subset of half cycles used by the first driver arrangement 22.

The second LED driver arrangement 24 also has a second buffering capacitor 60 and second blocking diode 62.

By connecting the two LED driver arrangements 22, 24 in series, each one can draw power from a different subset of half cycles.

During the phase of the AC input which is reserved for the other driver, the shorting element is activated so that the driver functions overall as a pass through switch (with current passing through two diodes of the diode bridge rectifier and through the shorting element).

There are therefore two input interfaces and two LED drivers in series. To avoid instability and non-uniform outputs, each driver is only operated during one subset of half cycles. This provides a time sharing use of the AC input power between the two LED driver arrangements. One subset of half cycles is the positive polarity phases of the input power signal and the other subset of half cycles is the negative polarity phases of the input power signal. This enables two LED driver arrangements, each with their own LED driver, to be placed in series to form the overall driver circuit.

In order to provide allocation of each LED driver arrangement to its respective subset of half cycles, synchronization is required, and this is implemented by the control arrangements 38,58.

Figure 3:
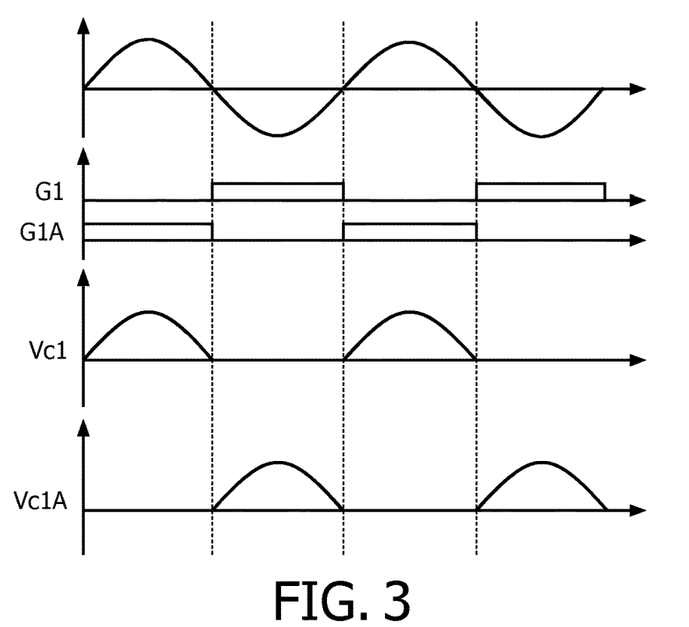
FIG. 3 shows the timing of operation of the two LED drivers used within the driver circuit of FIG. 2.

FIG. 3 shows one possible working sequence of the two LED driver arrangement.

The top plot shows the mains signal.

The signals G1 and G1A are the gate signals for the shorting transistors (G1 is for the first shorting element 36 and G1A is for the second shorting element 56). The output voltages Vc1 and Vc1A are also shown.

FIG. 3 shows that the two driver arrangements 22,24 work in an interleaved manner, with each driver arrangement operating during a set of half cycles. When G1 is low and G1A is high, the input voltage is applied only to the first driver arrangement 22. When G1 is high and G1A is low, the input voltage is applied only to the second driver arrangement 24.

To provide synchronization, one driver arrangement has to be allocated to a first half circle.

One possible approach is to measure the AC voltage before the bridge rectifiers, and to set one of the driver arrangements to function during the positive half cycles and to set the other to function during the negative half cycles.

This provides a simple approach but it results in different hardware settings between the two driver arrangements. This is undesirable as it requires control of production and requires care during assembly.

An alternative is to provide a design which means that by connecting input wires to the drivers differently, one can become a negative cycle unit and the other can become a positive cycle unit. Again this complicates assembly.

These approaches risk shorting the mains, if assembly or installation errors are made, since the two shorting transistors may then be able to turn on at the same time.

A preferred approach is to allocate the driver arrangements to a respective subset of half cycles based on a self-synchronization mechanism. This may also enable identical driver arrangements to be used as explained below.

Figure 4:
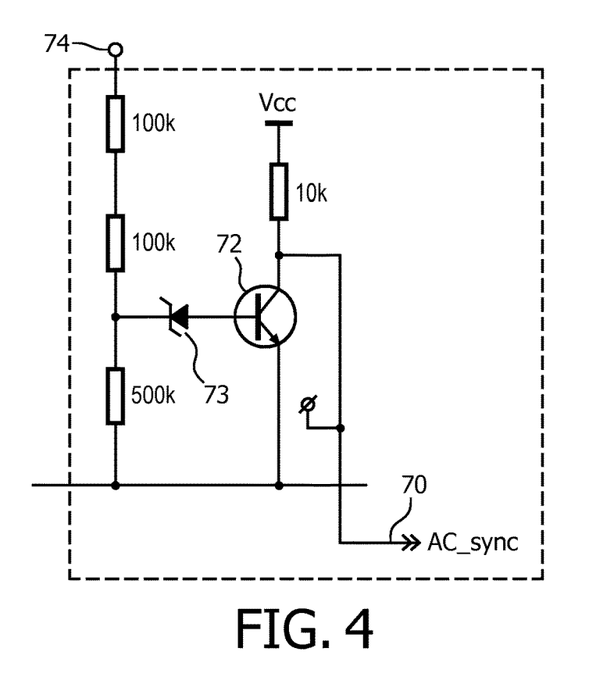
FIG. 4 shows an example of zero crossing detector.

A first function as part of the self-synchronization is to detect the phases of the AC input signal. FIG. 4 shows a zero crossing detecting circuit which may be used to detect changes in phase of the input mains voltage. Any zero crossing detector circuit may be used, and FIG. 4 shows a simple example based on a bipolar junction transistor 72. The base is connected to a potential divider output through a Zener diode 73. The potential divider generates a scaled version of the rectified AC input received at terminal 74 at its output.

The Zener diode is conducting for most of the time, turning on the transistor 72 and pulling the output 70 ("AC_sync") low. Only at the phase change time when there is a low voltage is the Zener diode non-conducting, so that a short pulse is generated when the output 70 is pulled high to the dc voltage Vcc. The circuit thus generates a pulse on the output 70 at each phase change.

Figure 5:
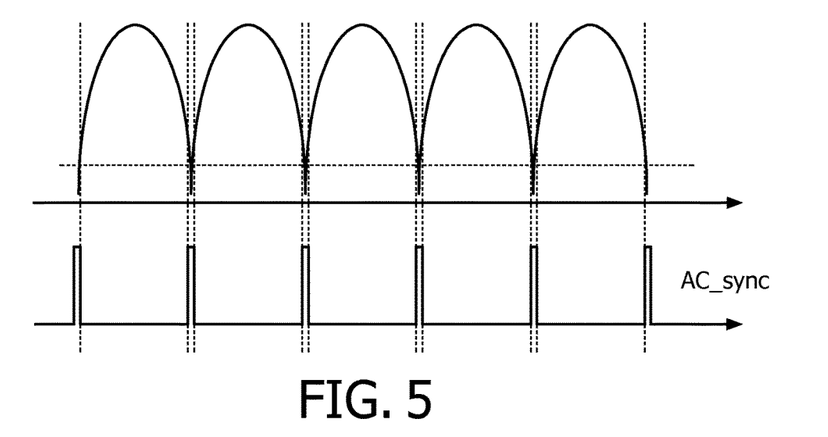
FIG. 5 shows waveforms to explain the operation of the detector of FIG. 4.

FIG. 5 shows the rectified AC input applied to the terminal 74 and the output signal AC_sync.

Figure 6:
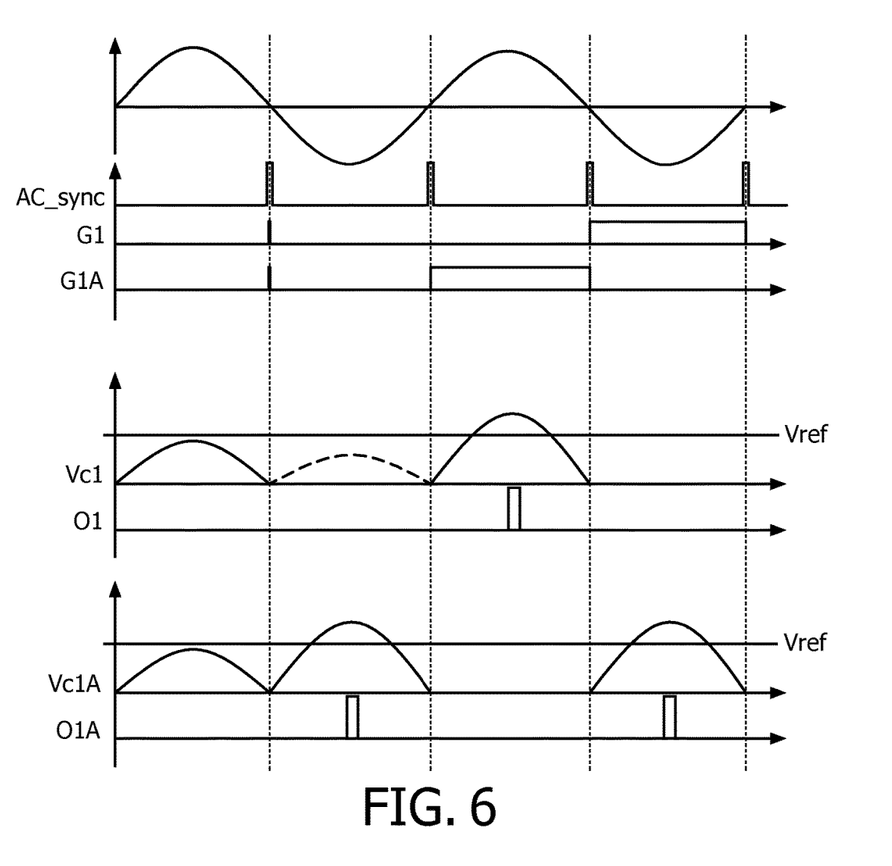
FIG. 6 is a timing diagram to explain a conflict resolution method.

FIG. 6 is used to explain the self-synchronization approach. This approach uses the inherent imbalance between the series connected LED drivers.

It is assuming the maximum peak value of the input voltage is Vin_max and the minimum peak value of input voltage is Vin_min.

The controller of each driver arrangement detects the rectified voltage Vc1 or VC1A after the full bridge rectifier.

During a start up time period, the shorting elements are not used, so that the two driver arrangements are connected in series permanently. This start up time period is the first two half cycles shown in FIG. 6.

In this condition, inherently, parameter tolerances and the closed loop control of each series driver arrangement will probably cause imbalance between the input voltages applied to the two series lamps.

Suppose Vc1A>Vc1 during the second half cycle of the start up period, as shown in FIG. 6.

A reference voltage Vref is set and is selected such that ½Vin_max<Vref<Vin_min. The control arrangements 38,58 each have a detection circuit which detects whether the voltage on the output is greater than this threshold. This means that only one of the two driver arrangements can ever reach Vref. This avoids erroneous operation of both shorting elements when the input voltage varies.

When Vc1A>Vref as shown in the second half cycle, the controller 58 of the second driver arrangement 24 generates an output signal O1A. It then waits for the phase change of the input mains signal (as determined by its own signal AC_sync).

As soon as the signal AC_sync becomes high, the controller 56 turns on its shorting element 56 so that in that half cycle (the third half cycle in FIG. 6) Vc1A=0.

The second driver arrangement 24 stops operation and acts in bypass mode during this third half cycle. As a result, Vc1 appearing in the first driver arrangement 22 increases to the rectified mains voltage. The first LED driver arrangement 22 then operates in this half circle.

Since Vc1>Vref, the controller of the first LED driver arrangement 22 will then generate an output O1 and wait for the phase change signal. As soon as its AC_sync signal is high, the shorting element 36 is turned on, so that Vc1=0 in the fourth half cycle shown in FIG. 6. The first driver arrangement 22 operates in bypass mode, and Vc1A will increase to the rectified mains voltage immediately.

This defines a repeating cycle, where a detection in one half cycle tells the driver arrangement that it should act in bypass mode for the next half cycle. As soon as instability or imbalance arises in the outputs during the start up time (when the shorting elements are not used), the two driver arrangements are able to resolve the conflict. As soon as the conflict is resolved, the system becomes stable.

In this way, the configuration circuit of each driver arrangement automatically sets its shorting element to be active every other half cycle of the AC power input and to be inactive during the rest of the half cycles of the AC power input. The circuit can self-configure with no calibration or particular connection scheme of the individual LED driver arrangements. When one driver arrangement is drawing more power than the other, it effectively allocates the next half cycle to the other LED driver arrangement by activating its own shorting element in the next half cycle. When both LED driver arrangements use this same approach (because they are for example identical), the required alternating actuation of the shorting elements results with no self-conflict.

Thus, if the driver arrangement is drawing more power in one half cycle than the other driver arrangement, e.g. a first half cycle (because the detected voltage in said first half cycle exceeds the threshold) then it will activate its shorting element in a next half cycle e.g. a second half cycle.

Similarly, if the driver arrangement is drawing less power in a one half cycle than the other driver arrangement e.g. a third half cycle (because the detected voltage in said first half cycle does not exceed the threshold), then it will deactivate its shorting element in a next half cycle e.g. a fourth half cycle.

It is noted that in the first half cycle as shown in FIG. 6, the voltage is relatively evenly divided between the two LED drivers. This is possible in the real operation and means there is no imbalance. However, it will not always be the case and an uneven voltage allocation will normally arise, which uneven allocation then triggers the self-synchronization as discussed above.

The invention is of particular interest for tubular LEDs which can be used as retrofit items to existing fluorescent tubular light luminaires. However, it may be applied other types of LED lamp. It may be used in a luminaire with any number of lamps, and where there are one or more pairs of lamps to be connected in series.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A first LED driver circuit comprising:
   a first input interface for receiving an AC power input and providing a first output, wherein said first output is adapted to be serially connected to a second LED driver circuit;
   a first LED driver powered by the first output;
   a first shorting element for shorting the first output;
   a first control arrangement for controlling the first shorting element, wherein the first control arrangement is configured to:
   close the first shorting element at a zero-crossing of a first subset of half cycles of the AC power input to short circuit the first LED driver and prevent the first LED driver from being powered, wherein the AC power input passes to the second LED driver during the first subset of half cycles, and
   open the first shorting element at a zero-crossing of a second subset of half cycles of the AC power input to power the first LED driver, wherein said second subset of half cycles does not overlap with the first subset of half cycles;

wherein the half cycle is the positive amplitude duration or the negative amplitude duration of the AC power input.

2. The first LED driver circuit as claimed in claim 1, further comprising:
a first buffering capacitor between the first shorting element and the first LED driver; and
a first blocking diode in a forward direction from the first shorting element to the first buffering capacitor.

3. The first LED driver circuit as claimed in claim 1, wherein the first control arrangement comprises a configuration circuit for:
closing the first shorting element every other half cycle of the AC power input, wherein the every other half cycle is the first subset; and
opening the first shorting element during the rest of the half cycles of the AC power input, wherein the rest of the half cycles is the second subset.

4. The first LED driver circuit as claimed in claim 3, wherein the configuration circuit comprises a detection circuit which detects whether the voltage on the output is greater than a threshold, and wherein the configuration circuit is adapted to close or to open the first shorting element based on the detection.

5. The first LED driver circuit as claimed in claim 4, wherein the configuration circuit is adapted to:
close said first shorting element in a second half cycle succeeding a first half cycle when the detected voltage in said first half cycle exceeds the threshold, and
open said first shorting element in a fourth half cycle succeeding a third half cycle when the detected voltage in said third half cycle does not exceed the threshold.

6. The first LED driver circuit as claimed in claim 5, wherein the configuration circuit further comprises a zero crossing detector circuit for detecting a phase change in the AC power input for determining the timing of each half cycle.

7. The first LED driver circuit as claimed in claim 1, wherein the first LED driver is a closed loop current source or a closed loop power source.

8. The first LED driver circuit as claimed in claim 1, wherein the input interface comprises a full bridge rectifier.

9. A driver system comprising the first LED driver circuit as claimed in claim 1, further comprising the second LED driver circuit, wherein the second LED driver circuit comprises:
a second input interface for generating a second output, the first and second input interfaces being electrically series connected between a pair of AC power input terminals which receive the AC power input;
a second LED driver powered by the second output;
a second shorting element for shorting the second output;
a second control arrangement for controlling the second shorting element, wherein the second control arrangement is configured to:
close the second shorting element during the second subset of half cycles of the AC power input to short circuit the second LED driver and prevent the second LED driver from being powered, wherein the AC power input passes to the first LED driver circuit during the second subset of half cycles of the AC power input while the first shorting element is opened, thereby the first LED driver is powered by the AC power input; and
open the second shorting element during the first subset of half cycles of the AC power input to power the second LED driver meanwhile the first shorting element is closed thereby the second LED driver is powered by the AC power input;
wherein said second subset of half cycles does not overlap with the first subset of half cycles.

10. The driver system as claimed in claim 9, wherein the driver system is further configured to:
swap the half cycles during which the first shorting element is opened and the half cycles during which the second shorting element is opened; and
swap the half cycles during which the first shorting element is closed and the half cycles during which the second shorting element is closed.

11. The driver system as claimed in claim 10, wherein the first and second LED driver circuits have identical hardware.

12. A lighting system comprising:
a first LED driver circuit as claimed in claim 1 and a first LED arrangement driven by the first LED driver; or
a driver system, a first LED arrangement driven by the first LED driver and a second LED arrangement driven by the second LED driver.

13. The lighting system as claimed in claim 12, wherein the first LED arrangement comprises a tubular LED, or the first and second LED arrangements each comprise a respective tubular LED.

14. An LED driving method, comprising:
providing first and second outputs each from a respective first and second input interface, with the first and second input interfaces electrically series connected and in electrically series between a pair of AC power input terminals which receive an AC power input;
shorting the first output and passing the AC power input to the second output at a zero-crossing of a first subset of half cycles of the AC power input, by closing a first shorting element, and meanwhile not shorting the second output, by opening a second shorting element, such that powering a second LED driver using the second output in the first subset of the half cycles;
not shorting the first output by opening the first shorting element at a zero-crossing of a second subset of half cycles of the AC power input, and shorting the second output and passing the AC power input to the first output by closing the second shorting element, such that powering a first LED driver using the first output in the second subset of the half cycles,
wherein said second subset of half cycles does not overlap with the first subset of half cycles.

15. The LED driving method as claimed in claim 14, wherein the LED drivers each comprise a closed loop current source or closed loop power source, and the method further comprises for each output:
detecting whether the voltage on the output is greater than a threshold,
shorting said output by closing the respective shorting element in a second half cycle succeeding a first half cycle when the detected voltage in said first half cycle exceeds the threshold, and
not shorting said output by opening the respective shorting element in a fourth half cycle succeeding a third half cycle when the detected voltage in said third half cycle does not exceed the threshold.

\* \* \* \* \*